Figure 1:
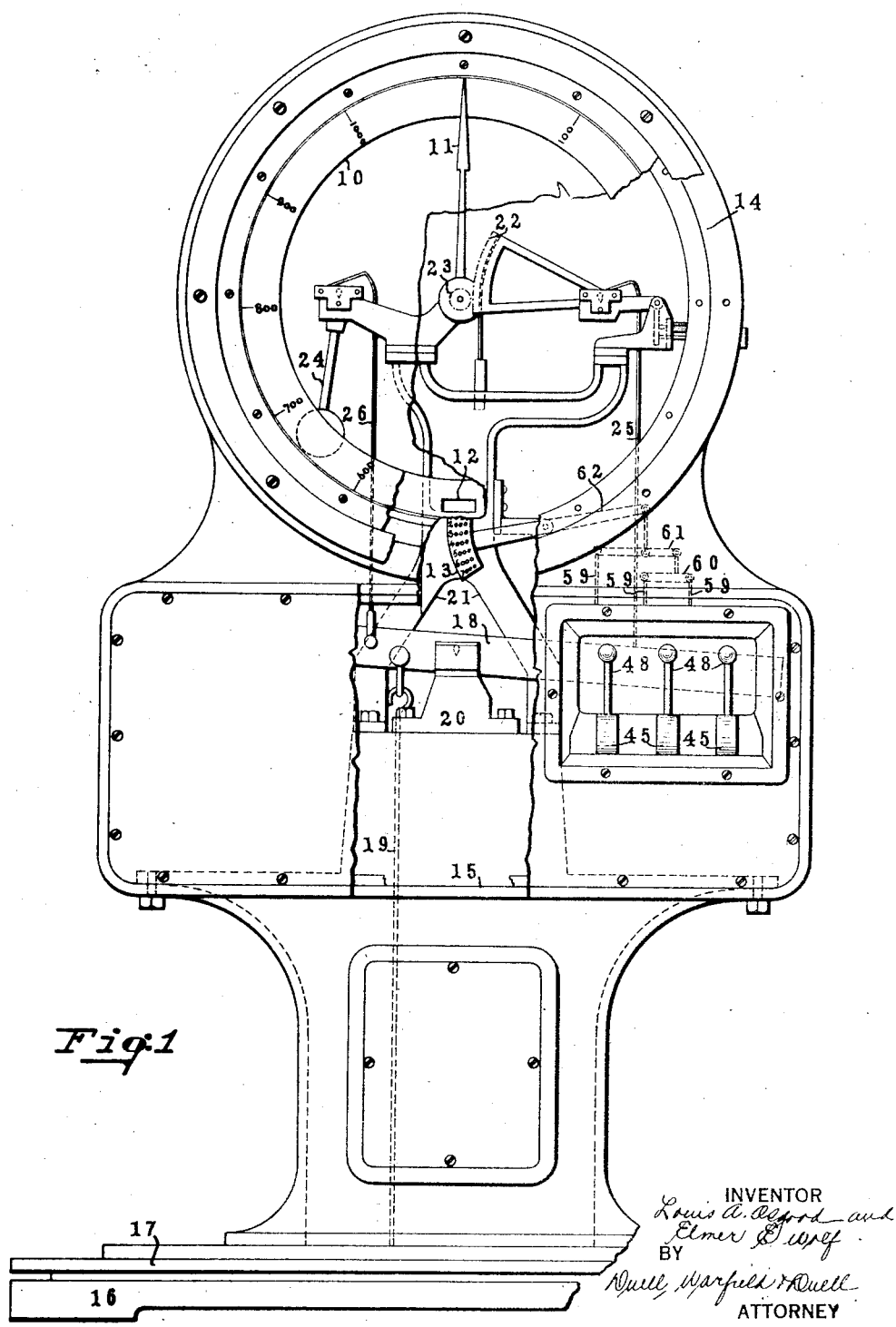

Oct. 20, 1925.

L. A. OSGOOD ET AL 1,557,606

SCALE

Filed Nov. 6, 1923

3 Sheets-Sheet 1

INVENTOR
Louis A. Osgood and
Elmer D. Wulf
BY
Duell, Warfield & Duell
ATTORNEY

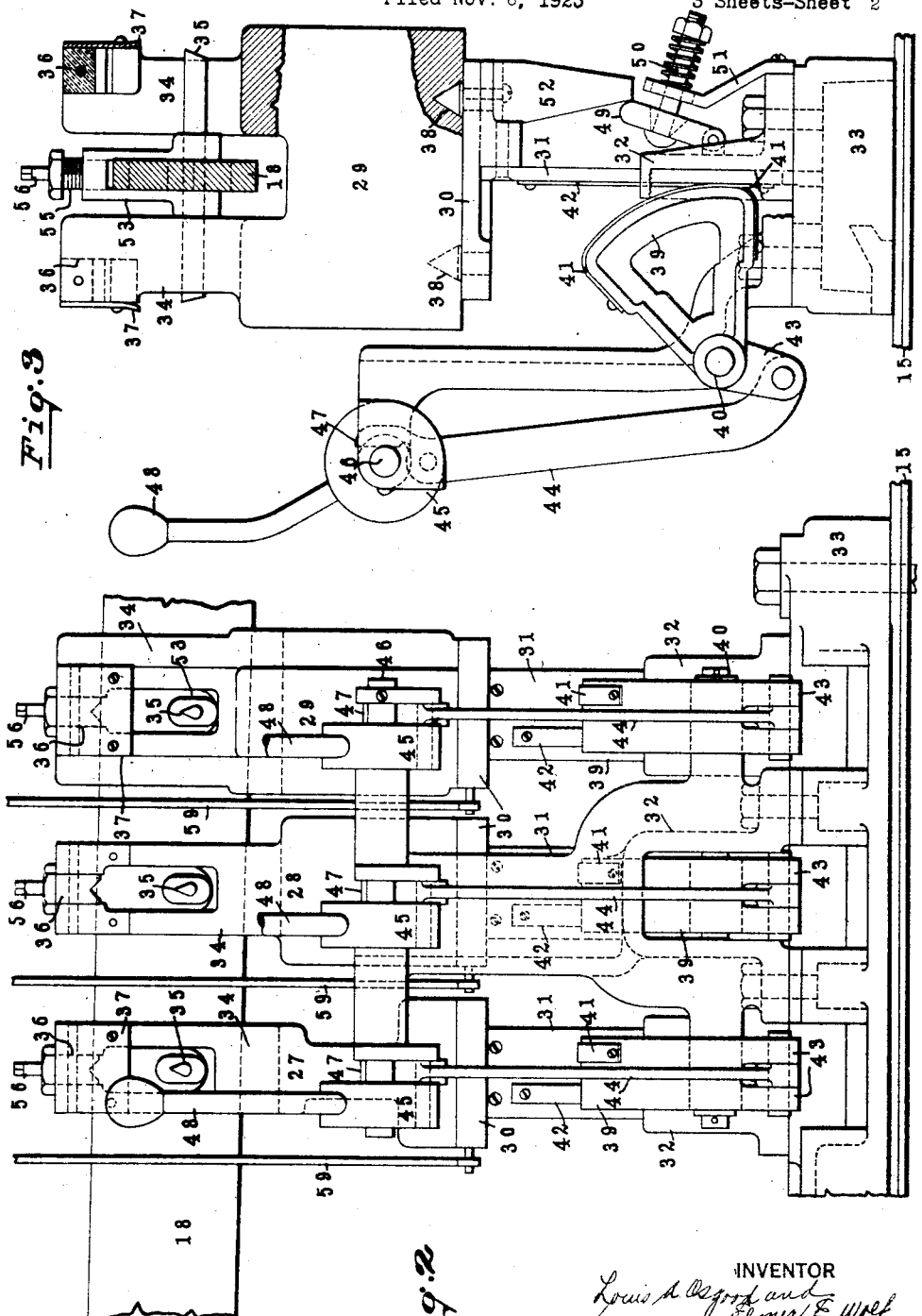

Oct. 20, 1925.
L. A. OSGOOD ET AL
1,557,606
SCALE
Filed Nov. 6, 1923
3 Sheets-Sheet 3
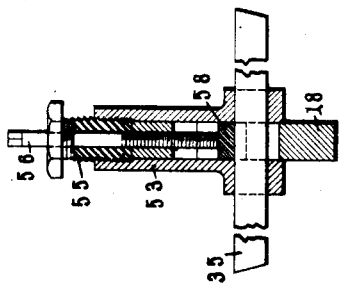
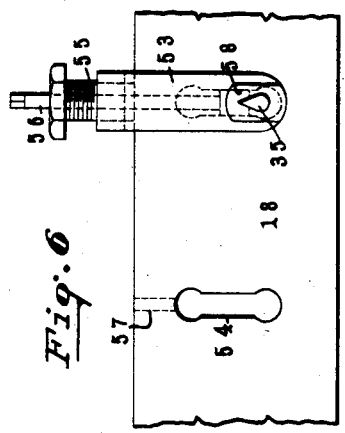
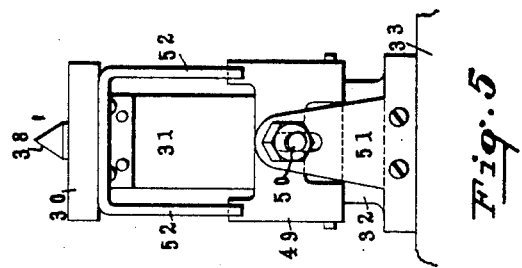
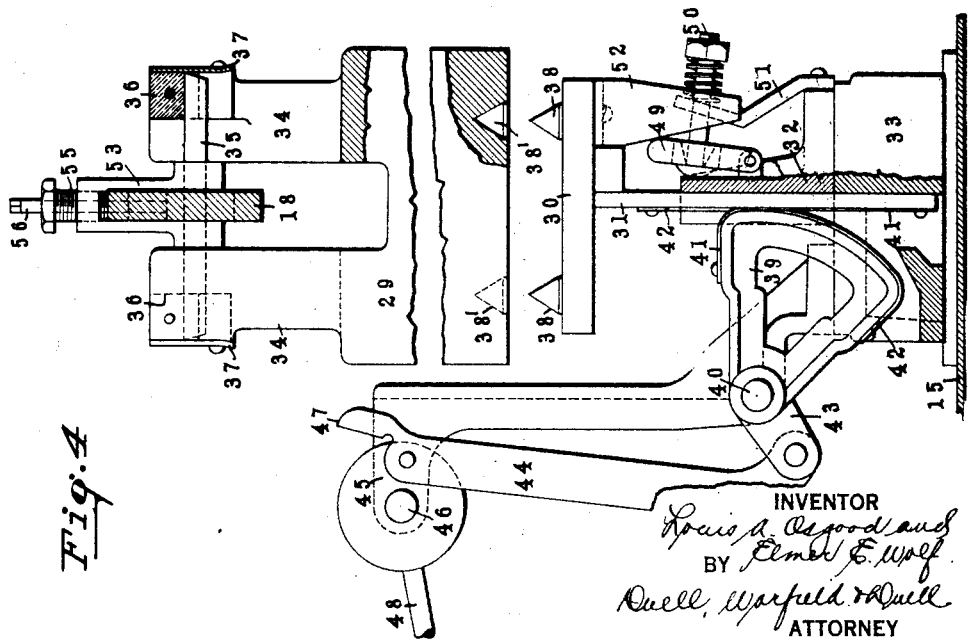

Patented Oct. 20, 1925.

1,557,606

UNITED STATES PATENT OFFICE.

LOUIS A. OSGOOD, OF HARTFORD, CONNECTICUT, AND ELMER E. WOLF, OF SPRINGFIELD, OHIO, ASSIGNORS TO E. AND T. FAIRBANKS AND COMPANY, OF ST. JOHNSBURY, VERMONT, A CORPORATION OF VERMONT.

SCALE.

Application filed November 6, 1923. Serial No. 673,063.

*To all whom it may concern:*

Be it known that we, LOUIS A. OSGOOD and ELMER E. WOLF, citizens of the United States, residing, respectively, at Hartford, in the county of Hartford, State of Connecticut, and at Springfield, in the county of Clark, State of Ohio, have invented certain new and useful Improvements in Scales, of which the following is a specification.

This invention has reference to a weighing scale and aims to provide a device of this character presenting certain improvements over articles of a similar nature as heretofore constructed.

It is an object of the present invention to provide a scale capable of operating over a wide range, with a maximum of sensitiveness throughout that range.

It is a further object to provide a device of the character described in which poise elements are employed to increase the scale range which elements may be applied in an improved manner and with a minimum of wear and tear upon the scale.

A still further object of this invention is to be predicated to a scale for weighing articles including mechanism of such a nature that the response thereof may be rendered sluggish or fast.

Another object is that of constructing a scale in which a plurality of weights may be employed to individually or collectively act as a counterpoise, and according to which the value of this counterpoise will be greater than has generally been regarded as feasible by the use of an equal number of weights.

Still another object is that of furnishing a number of weights acting as a counterpoise, and in constructing and arranging these weights in relation to the mechanism of the scale in such a manner that an improved system of using the scale may be practiced, the system being such that an attendant may more efficiently operate the scale.

An additional object is that of furnishing a scale which may be of that type commonly known as an "increase capacity scale" and which will incorporate the advantages brought out in the foregoing objects.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a front elevation of a scale embodying the construction of the present invention, certain of the exterior portions of this scale being broken away to disclose the underlying structure, Fig. 2 is a fragmentary front view of the weight actuating mechanism of the scale, Fig. 3 is a partly sectional side view thereof and showing the parts in one position, Fig. 4 is a view similar to Fig. 3, and showing the parts in a position different from that illustrated in the foregoing figure, and Figs. 5, 6 and 7 are views showing details of the mechanism of the scale.

In the present instance, the mechanism of the invention has been shown in association with a scale of that type commonly known as an increase capacity scale, for use in connection with which it is particularly adapted. This scale may include a registering mechanism in the form of a graduated main dial 10, with which a pointer 11 registers. The registering mechanism further embraces, in the present instance, a window 12 in the body of the dial 10, through which a portion of a graduated plate 13 is visible. The dial 10 is mounted in a casing 14 which is extended in the form of a housing 15 mounted upon a base 16. Suitably carried upon the lower portion of the base is the load receiving member of the scale, in the present instance, a platform 17, and this platform is operatively connected with a scale beam 18 disposed within the housing 15, by any suitable means such as a pivotally secured rod 19. The beam 18 is pivotally mounted upon a bracket 20 conveniently supported within the housing 15. A standard 21 of suitable construction is mounted upon the base or other desirable fixed portion of the scale, and this affords a suitable mounting for the shaft of the hand 11, as well as an arcuate rack 22 which cooperates with a pinion 23 attached to the shaft. Furthermore, it will be observed that the standard 21 carries a pendulum weight 24 and the rack 22 and weight 24 are connected with the beam 18 in any suitable manner, as, for example, by tapes 25 and 26 respectively.

If now, the load receiving portion of the scale has an article to be weighed placed upon it, it will be obvious that this article will serve, in the present exemplification, to depress the platform 17 and consequently move the rod 19, this operation in turn serving to move the beam 18. According to the present type of scale, the pendulum weight 24 may constitute a counterpoise equal to the indicated capacity which the dial 10, together with the pointer 11 are capable of registering. Thus, conceding that an article does not weigh in excess of the initial capacity of the scale, it is obvious that the weight thereof will be registered by the dial 10 and pointer 11 upon the article being associated with the weight receiving portion of the scale. Should the weight of the article placed upon the platform 17 exceed the initial capacity of the scale, it will be obvious, according to the present structure, that the pointer 11 will traverse the dial 10 and come to rest at a point beyond the graduation of highest value presented by the same. When this occurs, it will be apparent to an observer, that the initial capacity of the scale has been exceeded, and in order to weigh the article it becomes necessary to increase the value of the counterpoise, the value of this increase being preferably indicated in any suitable manner, as, for example, by a subsidiary indicating means forming a part of the registering mechanism of the scale, and including a plate 13 and window 12, the former being suitably connected with the mechanism by means of which the value of the counterpoise is increased or diminished.

In the present embodiment of the invention, the mechanism for increasing the value of the counterpoise comprises three weights including bodies 27, 28 and 29 preferably arranged adjacent each other, and adapted to be removed from or associated with the beam 18 at points along the length of the same, by suitable mechanism hereinafter described.

Assuming now, due to the manner of association of these weights with the scale mechanism, or for the reason that the weights are of different sizes, or due to both of these conditions that the weight 27 when associated with the beam constitutes a counterpoise of a value of 1000 units, the weight 28, 2000 units, and the weight 29, 4000 units, it will be obvious that the capacity of the scale may be correspondingly increased, the primary mechanism, i. e., the weight 24 as well as the dial and pointer therefor, as in Fig. 1, having an initial capacity of 1000 units. If now, the weight 27 is brought to a position at which it will act as a counterpoise, it will be obvious that the capacity of the scale has been increased to 2000 units, the presence of 1000 units of which will be indicated through the window 12 by the plate 13, the second thousand being indicated by the pointer 11 and dial 10. A removal of the weight 27 from the beam and the association of the weight 28 therewith, will raise the total capacity of the scale to 3000 units, 1000 of which are again indicated upon the dial, the balance being indicated by the plate. Similarly, a capacity increase of the scale to 4000 units may be accomplished by associating both the weights 27 and 28 with the scale mechanism, and by moving these weights into inoperative position and moving the weight 29 to its operative position, i. e., that in which it is associated with the beam, the capacity is increased to 5,000 units, it being observed that a capacity of 6,000 is accomplished by the use of both of the weights 27 and 29, 7,000 by the weights 28 and 29, and 8,000 by all of the weights in conjunction with the pendulum weight 24. Thus it is obvious that an operator may readily incorporate a counterpoise of given value in operative association with the scale mechanism, this operation being entirely selective at the option of the operator, it being noted that the capacity of the scale may be increased to any given value by simply associating one or more of the counterpoise weights with the beam, this association being accomplished by moving the weights to be deposited in substantial unison or individually, as may be desired.

It will be obvious that by means of the selective system for incorporating different values of counterpoise, a decided improvement is achieved over previous structures of the same general class in the majority of which a weight receiver is employed in conjunction with a weight cage, the latter carrying a number of weights, each constituting a counterpoise of a value equal to others of the same, it being necessary to transfer these weights in sequence and by means of a suitable mechanism, from the weight cage and weight receiver in order to build up a counterpoise of a desired value.

Now referring to the mechanism for associating or removing the weights from the beam 18, or other part of the scale mechanism, it will be perceived in the present instance, that weight depositing and lifting units have been employed, which correspond in number to the number of weights provided. In view of the fact that each of these mechanisms preferably corresponds in construction and operation to the others, only one of the same will be here described in detail. Thus, reference being had to Figs. 2 and 3, the numeral 30 indicates a weight receiving platform which is carried by an arm 31 mounted for vertical movement within suitable guides 32. These guides may be carried upon a supporting block 33 which is formed with a slot providing a continuation of the action afforded by the guides so that the arm 31 and platform carried thereby, will be confined to one path of travel. Carried upon the platform 30 is the weight 29, and this weight in the present exemplification, is formed with a cross-shaped groove in its upper edge, to provide two pairs of upwardly extending lugs 34. The space between these pairs of lugs is sufficient to accommodate the beam 18 and permit free movement of the same as is best shown in Fig. 3. The beam at points adjacent each of the weights, carries a weight supporting pin in the nature of a pivot member 35, which extends into the space existing between the adjacent lugs 34 and a bridging portion such as a bearing member 36, is secured to these lugs adjacent their upper ends and extends across the space between the same, so that the pin 35 is capable of engaging this member to properly support the weight.

Thus, it will be understood in use, assuming the weight is in the position illustrated in Fig. 3, and that it is desired to associate the same with the beam, i. e., move the parts in the position shown in Fig. 4, that the arm 31 is lowered, thus correspondingly moving the platform 30 to a point at which the upper edges of the pin 35 will engage the bearings 36, it being noted that friction plates 37 are preferably carried by each of the bearing members 36 in order to guide the pin 35 and to prevent any displacement of the weight relative thereto, during this movement of the parts. The platform 30, upon continuing its downward travel, will move free of the weight 29 and upon assuming its final position, the weight 29 will be wholly supported by the beam during the movements of the latter. It will be obvious that upon it being desired to return the parts from the position in Fig. 4 to that illustrated in Fig. 3, the operations aforedescribed will be reversed and it is here to be noted, in order to center the weight upon the platform upon the former being supported by the latter, that it is preferred to provide suitable guiding means such as, for example, conical pins 38 in association with the platform, which pins extend to correspondingly shaped recesses 38' in the under face of the weight, it being obvious that this structure or an alternative form of guiding means will serve under all conditions, to bring the parts to properly correlated positions.

Now with a view to furnishing a mechanism for producing the desired movements on the part of the platform 30, it will be perceived that an arcuate shaped member 39 may be pivotally mounted as at 40 adjacent the arm 31, and this member is capable of being swung from the position shown in Fig. 3 to that illustrated in Fig. 4, or vice versa, by preferably utilizing a pair of tapes 41 and 42 respectively. The first of these tapes has one of its ends conveniently attached to the upper face of the member 39 and extends along the arcuate edge of the same, its opposite end being attached to the lower end of the arm 31. Thus, upon the member 39 being rocked upwardly, the arm and platform carried thereby will be moved in a vertical plane. The second tape 42 has one of its ends attached to the lower face of the member 39 and similar to the tape 41, extends adjacent the curved face thereof, but has its opposite end attached to the arm 31 at a point adjacent the upper end of the latter. In practice, it is in some instances not absolutely necessary to employ this last named tape, in that the action of gravity will be such as to cause the parts, i. e., the weight platform, etc., to move downwardly upon this movement being permitted, but is has been found, in practice, that in order to afford a positive movement of the parts, it is in most instances desirable to utilize the same. While any convenient mechanism for rocking the member 39 may be utilized according to the type of scale with which the mechanism is placed in association, it is preferred in most instances that this member be formed wth ears 43 extending beyond the pivot 40, and these ears may have a link 44 which has one of its ends pivotally attached thereto, its opposite end being secured to a crank portion 45 of a shaft 46, the link being extended beyond its point of pivotal connection with the shaft in the form of a lug 47, indicated in dotted lines in Fig. 3 and which bears against the body of the shaft 46 in order to limit the movement of the parts when the same are in the position illustrated in the figure last mentioned. A suitable handle 48 may be attached to the shaft 46 in order to turn the same, and it is thus obvious that upon the handle being manipulated, the weights will be associated with or removed from the beam 18.

A scale of the type illustrated, often receives rough usage, and it will be apparent that if the weights were deposited by violently striking the handles 48, that certain parts of the mechanism (notably the pivots and bearing members) might be eventually damaged to such an extent that the scale would not operate properly. In order to prevent this damage occurring, a mechanism may be utilized which will have the qualities of a shock absorber. Thus, as in Figs. 3, 4 and 5, a latch 49 is rockingly attached to the guide members 32 and a spring bolt 50 attached to this latch and to a bracket 51, serves to normally retain the former in one position. Secured to the under side of the platform 30 is a plunger 52, which has one face disposed at an angle to its path of travel and adapted for engagement with the end of the latch 49. Upon a person suddenly moving the handle 48 to lower the platform, it will be understood that this lowering will cause sliding frictional contact between the plunger and the latch, and the resistance offered to the movements of the parts will be increased as the weight moves to a position at which it will be supported by the pin, thus slowing down the action of the parts. Thus, it will be understood that the liability of damage occurring is reduced to a negligible quantity.

It is obvious that any suitable registering mechanism may be utilized for indicating the operative association or removal of one or more of the counterpoise weights with the scale mechanism, for example, there may be attached to each of the platforms 30, a link 59 two of which are connected to a primary beam 60, in turn connected by a link to a secondary beam 61, the third weight, in the present instance the one of least value, being directly connected by its link 59 to the secondary beam. This element is attached by any suitable means to a lever 62 carrying the plate 13, and it has been found that by means of this linkage, the plate 13 will be properly moved upon one or more of the platforms having been lowered in order to indicate the value of the counterpoise which has been placed in association with the mechanism.

Finally, in order to permit of the response of the scale being rendered fast or sluggish, it will be perceived that each of the pins 35 is carried by a supporting member 53, which may have a U-shaped configuration, and have its arms depending over and adjacent to the side faces of the beam 18. Openings 54 are formed in the beam at those points adjacent which the pins 35 are to be disposed, and these openings are of such a length as to permit movement of the pin transverse to the body of the beam. The pin 35 extends through openings adjacent the ends of the arms of the member 53 and this member is formed with a bored and tapped upper end portion, within which a correspondingly threaded plug 55 is positioned. The plug is formed with a bore within which a rod 56 is rotatably disposed, the latter having screw-threaded engagement with a similarly threaded bore 57 extending in the present instance, from the upper edge of the beam to the opening 54 thereof, and this rod preferably engages a bearing member 58 which lies adjacent to the upper edge of the pin 35. It will be obvious that if this form of construction is utilized, the pin may be adjusted relative to the beam and moved longitudinally of the opening 54 by simply unscrewing the plug 55 and subsequently rotating the pin 56, resulting in the latter being projected, which movement may continue until the outward movement of the member 53 and consequently the pin 35 is arrested by the inner end of the plug 55 again contacting with the upper edge of the beam. Similarly, if it is desired to elevate the pin 35 in the opening 54, this may be accomplished by turning the pin 56 in a direction resulting in its retraction to a distance equal to that through which the pin is to be elevated, and in subsequently turning the plug 55 down in order to move the member 53 and consequently the pin 35. Thus it will be appreciated that the centers of gravity of the beam and counterpoise are shifted relative to each other, whereby the degree of responsiveness of the scale mechanism may be rendered more sensitive or acute and more sluggish as may be found necessary or desirable.

In operation it will be understood, assuming that a load is placed upon the platform 17, of the scale, and conceding that this load does not exceed the initial capacity of the weighing and registering mechanisms, the weight of the same will be indicated by the dial 10 and pointer 11. If, on the other hand, the article exceeds this weight the pointer 11 will traverse the dial and move adjacent to or beyond the highest graduation of the same, it being then obvious to the person operating the scale that the initial capacity of the same has been exceeded. Knowing approximately the weight of the article placed upon the load receiving portion of the scale, he may selectively associate a weight of desired counterpoise value with the scale mechanism by moving any of the three handles 48, it being noted, as has been before brought out, that by the proper manipulation of these handles, a counterpoise of any desired value may be instantly provided by a simple operation. It is to be understood in this connection, that it is preferred that one of the weights may constitute a counterpoise of a value equal to the initial capacity of the scale, so that when the same is placed in association with the mechanism, the capacity will be doubled. It is also preferred that the next counterpoise weight be of a value double the first one, while the third weight serving as a counterpoise, should be of a value double that of the second mentioned weight, in other words, by having the first counterpoise weight of a value equal to the initial capacity, and by doubling the value of each consecutive counterpoise weight relative to the weight preceding it, it will be observed that a counterpoise of any desired aggregate value may be built up without any great mental effort on the part of the operator, and it is to be understood that if desired, any acquired number of counterpoise weights might be placed in association with the scale mechanism.

It will furthermore be perceived that the weight depositing and removing mechanism utilized is of such a nature as to constitute a considerable improvement over mechanisms as heretofore provided, in that aside from other advantages achieved, the liability of damage occurring to the parts is reduced to a minimum. Also, it will be noted that by means of a scale provided within the scope of the present invention, such as for example that illustrated, the capacity of the scale is materially increased over the capacity of the usual type of scale, using the same number of counterpoise weights. Furthermore, by having the handles 48 accessible and visible to the operator, it will be obvious that a double check will be provided in the event that the value of the counterpoise is increased over that provided by the pendulum weight 24, due to the fact that when one or more of the counterpoise weights are in association with the beam, this fact will be indicated not alone by means of the plate 13 but also by the fact that one or more of the handles will be depressed.

Thus, among others, the objects aforementioned are accomplished and it will be perceived that the mechanism may be rearranged and modified according to the most desirable practice, and that any suitable registering means may be used in connection with the same in lieu of the plate 13 and other registering means herewith shown.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A scale including in combination, a weight mechanism adapted to have an article to be weighed associated therewith, a plurality of means providing a counterpoise of variable value, positive means for selectively associating said counterpoise means with said mechanism and means for varying the degree of responsiveness of said mechanism.

2. A scale including in combination, a pivotally mounted beam adapted to move upon an article to be weighed being associated therewith, a weight pivotally connected with said beam and means for shifting one of said pivots whereby the movements of said beam may be optionally rendered increasingly sluggish or increasingly acute.

3. A scale including in combination, a pivotally mounted beam adapted to move upon an article to be weighed being associated therewith, said article being pivotally connected with said beam, a weight pivotally connected with said beam and means for shifting one of said pivots whereby the movements of said beam may be optionally rendered increasingly sluggish or increasingly acute.

4. A scale including in combination, a pivotally mounted beam adapted to move upon an article to be weighed being associated therewith, a weight pivotally connected with said beam and means for moving said pivots relative to each other whereby the movements of said beam may be optionally rendered increasingly sluggish or increasingly acute.

5. A scale including in combination, a pivotally mounted beam adapted to move upon an article to be weighed being associated therewith, a weight pivotally connected with said beam and means for moving said pivots in a vertical plane relative to each other whereby the movements of said beam may be optionally rendered increasingly sluggish or increasingly acute.

6. A scale including in combination, a pivotally mounted beam adapted to move upon an article to be weighed being associated therewith, a weight pivotally connected with said beam and means for shifting the weight pivot relative to said beam pivot whereby the movements of said beam may be optionally rendered increasingly sluggish or increasingly acute.

7. A scale comprising in combination, a weighing mechanism including a beam, a weight adapted to be associated with said beam, said weight being formed with a cross-shaped groove in its upper face, said beam lying within one portion of said groove and a pin carried by said beam and adapted to extend into other portions of said groove.

8. A scale comprising in combination, a weighing mechanism including a beam, a weight adapted to be associated with said beam, said weight being formed with a cross-shaped groove in its upper face, said beam lying within a portion of said groove, a fulcrum pin carried by said beam and adapted to extend into other portions of said groove and means providing a bearing for said pin and bridging the space existant between the edges of certain of the portions of said groove.

9. A scale including in combination, a movable beam, a fulcrum pin carried by said beam, a weight carrier, a weight adapted to be supported by said carrier or by said pin, and means for properly correlating said weight with said pin upon being transferred to the latter.

10. A scale including in combination, a movable beam, a fulcrum pin carried by said beam, a weight carrier, a weight adapted to be supported by said carrier or by said pin, and means carried by said weight and cooperating with said pin for properly correlating these elements when said weight is transferred to said pin.

11. A scale including in combination, a movable beam, a fulcrum pin carried by said beam, a weight carrier, a weight adapted to be supported by said carrier or by said pin, and friction plates carried by said weight and adapted to be engaged by the ends of said fulcrum pin upon said weight being associated with the same, whereby to properly correlate these elements.

12. A scale including in combination, a weighing mechanism, a weight adapted to be associated therewith, a platform adapted to carry said weight, an arm attached to said platform, means for guiding said arm and a number of flexible members connected with said arm whereby said platform may be moved to associate the weight with said mechanism.

13. A scale including in combination, a weighing mechanism, a weight adapted to be associated therewith, a platform adapted to carry said weight, an arm attached to said platform, an arcuate shaped member pivotally mounted adjacent said arm, means for moving said member and a pair of flexible members, each having one of their ends attached to said arcuate member, their opposite ends being attached to said arm whereby, upon said member being rocked, the platform will be moved to associate the weight with said mechanism.

14. A scale including in combination, a weighing mechanism, adapted to have an article to be weighed associated therewith, means providing a counterpoise, means for associating said counterpoise with said mechanism, supporting means for said last named means, a latch associated with one of said last named elements and means associated with others of the same and cooperating during the movements of the parts with said latch, said means and latch acting as a shock absorber.

15. A scale including in combination, a weighing mechanism adapted to have an article to be weighed associated therewith, means providing a counterpoise, means for associating said counterpoise with said mechanism, supporting means for said last named means, a plunger associated with one of said last named elements and means associated with others of the same and cooperating with said plunger, said last named parts acting as a shock absorber.

16. A scale including in combination, a weighing mechanism adapted to have an article to be weighed associated therewith, means providing a counterpoise, means for associating said counterpoise with said mechanism, supporting means for said last named means, a latch associated with one of said elements, a plunger associated with the other of the same and cooperating with said latch, said plunger and latch acting as a shock absorber.

17. A scale including in combination, a weighing mechanism adapted to have an article to be weighed associated therewith, means providing a counterpoise, means for associating said counterpoise with said mechanism, supporting means for said last named means, a latch associated with said last named means, a plunger associated with said counterpoise associating means and cooperating with said latch, said latch and plunger acting as a shock absorber.

18. A scale including in combination, a weighing mechanism adapted to have an article to be weighed associated therewith, means providing a counterpoise, means for associating said counterpoise with said mechanism, supporting means for said last named means, a swingingly mounted latch carried by one of said last named means and means carried by the other of the same and cooperating with said latch, said latch and cooperating means acting as a shock absorber.

19. A scale including in combination, a weighing mechanism adapted to have an article to be weighed associated therewith, means providing a counterpoise, means for associating said counterpoise with said mechanism, supporting means for said last named means, a spring pressed latch carried by one of said last named means and means carried by the other of the same and cooperating with said latch, said latch and cooperating means acting as a shock absorber.

20. A scale including in combination, a weighing mechanism adapted to have an article to be weighed associated therewith, means providing a counterpoise, means for associating said counterpoise with said mechanism, supporting means for said last named means, a swingingly mounted, spring pressed latch carried by one of said last named means and means carried by the other of the same and cooperating with said latch, said latch and cooperating means acting as a shock absorber.

21. A scale including in combination, a weighing mechanism adapted to have an article to be weighed associated therewith, means providing a counterpoise, means for associating said counterpoise with said mechanism, supporting means for said last named means, a spring pressed latch carried by one of said last named means and a plunger carried by the other of the same and cooperating with said latch, said plunger and latch acting as a shock absorber.

22. A scale including, in combination, a weighing mechanism adapted to have an article to be weighed associated therewith, and a shiftable fulcrum member associated with part of said mechanism, said fulcrum member including a pin, a supporting member attached thereto, means for moving said supporting member and means for locking said last named means against further movement.

23. A scale including in combination, a weighing mechanism adapted to have an article to be weighed associated therewith and a shiftable fulcrum member associated with part of said mechanism, said fulcrum member including a pin, a U-shaped supporting member secured thereto and means for moving said supporting member relative to other of the scale mechanism.

24. A scale including in combination, a weighing mechanism adapted to have an article to be weighed associated therewith and a shiftable fulcrum member associated with part of said mechanism, said fulcrum member including a pin, a U-shaped supporting member secured thereto and being adapted to have its arms straddle a portion of the scale mechanism, and means for moving said member relative to the portion which it straddles.

25. A scale including in combination, a weighing mechanism adapted to have an article to be weighed associated therewith and a shiftable fulcrum member associated with part of said mechanism, said fulcrum member including a pin, a supporting member disposed adjacent to certain of said mechanism, a plug carried by said supporting member and a rod also carried by said supporting member, said rod and plug being in operative association with the parts of said mechanism and movable relative to the same and to said supporting member whereby to shift said pin relative to said mechanism.

26. A scale including in combination, a pivotally mounted beam, a plurality of pins carried by said beam, a plurality of weights corresponding in number to the number of pins employed, a platform for each of said weights, and means for individually moving each of said platforms whereby said weights may be transferred therefrom to the pins carried by said beam.

27. A scale including in combination, a pivotally mounted beam, a plurality of pins carried by said beam, means whereby said pins may be moved relative to said beam, a plurality of weights corresponding in number to the number of pins employed, a platform for each of said weights and means for individually moving each of said platforms whereby said weights may be transferred therefrom to the pins carried by said beam.

28. A scale including in combination, a pivotally mounted beam, a plurality of pins carried by said beam, a plurality of weights corresponding in number to the number of pins employed, a platform for each of said weights, and means associated with said platforms and acting as shock absorbers during the association of said weights with said pins.

Signed at Hartford, Connecticut, this 24th day of October, 1923.

LOUIS A. OSGOOD.

Signed at Springfield, Ohio, this 29th day of October, 1923.

ELMER E. WOLF.